July 30, 1929.  R. B. HUNTER  1,722,296
CONTROLLER FOR ELECTRIC MOTORS
Filed Jan. 7, 1926   2 Sheets-Sheet 2
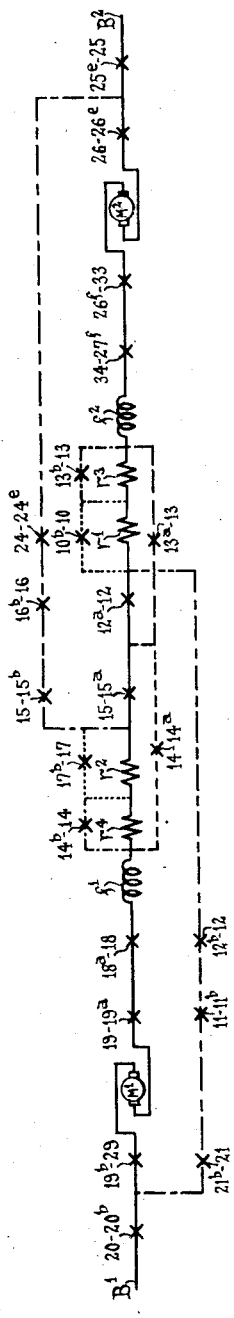
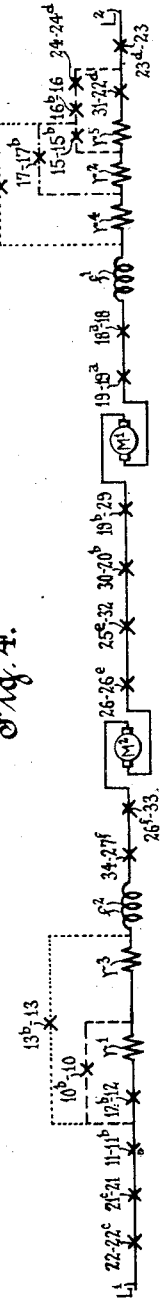
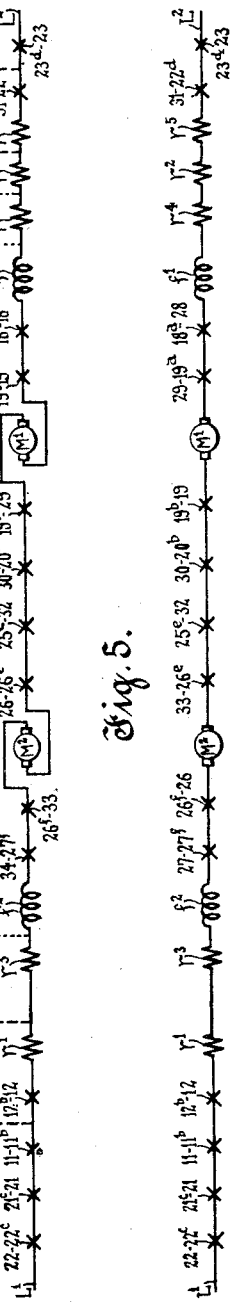
INVENTOR.
Richard B. Hunter
BY Frank H. Hubbard
ATTORNEY Patented July 30, 1929.

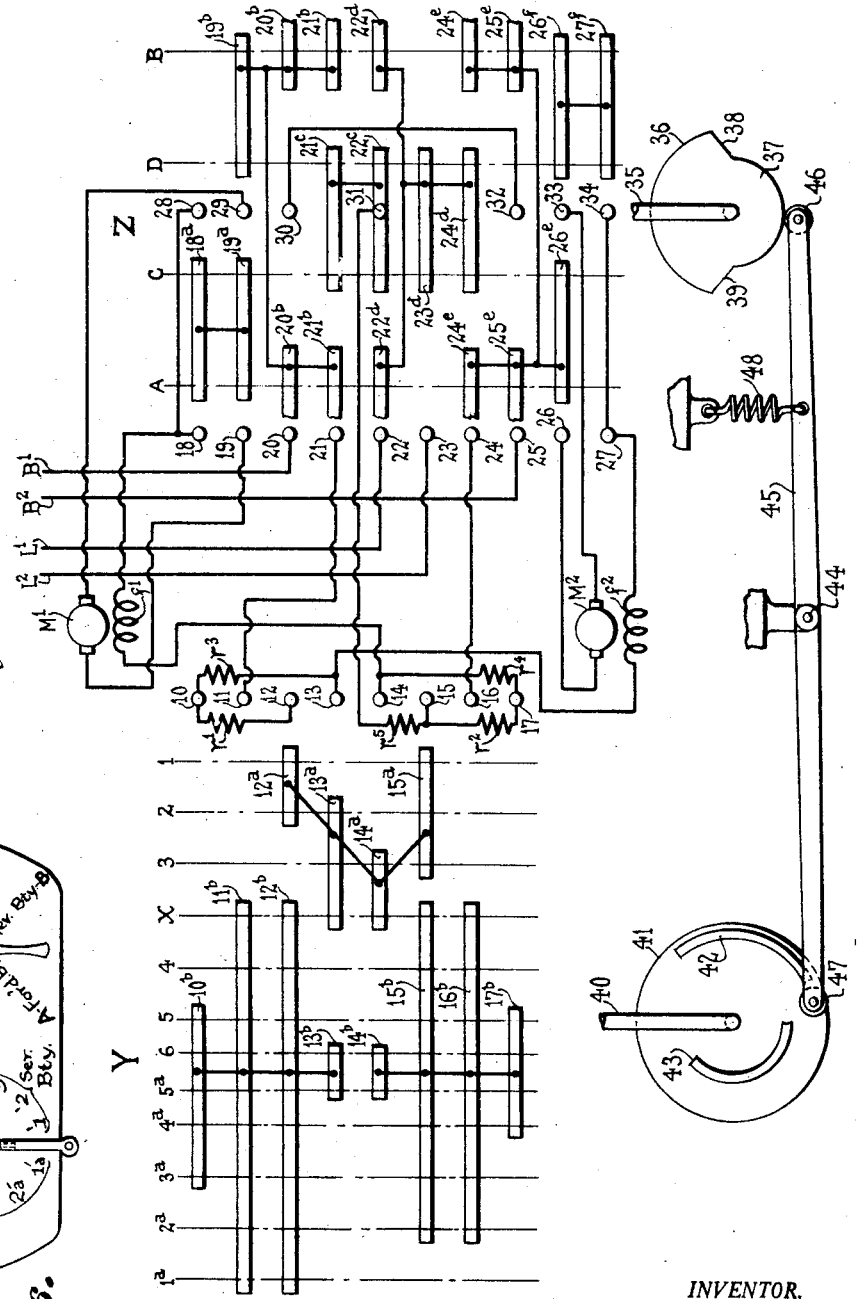

1,722,296

UNITED STATES PATENT OFFICE.

RICHARD B. HUNTER, OF SHOREWOOD, WISCONSIN, ASSIGNOR, BY MESNE ASSIGNMENTS, TO CUTLER-HAMMER INC., A CORPORATION OF DELAWARE.

CONTROLLER FOR ELECTRIC MOTORS.

Application filed January 7, 1926. Serial No. 79,749.

This invention relates to controllers for electric motors, and more particularly to drum controllers for combined battery and trolley vehicles such as mine locomotives.

Such devices ordinarily comprise a plurality of jointly operable electric motors, and one object of the invention is to provide means for effecting series parallel commutation of the circuits of the motors when the same are supplied with energy from a battery and for effecting series commutation only when the motors are supplied with energy from the trolley.

Another object is to provide means whereby the aforementioned series parallel or series commutations may be effected by movement of the main or accelerating drum in opposite directions respectively from a given position thereof.

Another object is to provide an auxiliary drum adapted to function as a combined reverse and transfer switch, whereby the circuit connections for the motors may be changed from battery to trolley, or vice versa, and also providing for reversal of the direction of operation of the motors jointly.

Another object is to provide novel interlocking means between the drums whereby the main drum is movable only in one direction or the other depending upon the position of the auxiliary drum.

Another and more specific object is to provide interlocking means of the above character whereby the motor circuits are limited to series commutation thereof when energy is supplied thereto from the trolley.

Other objects and advantages of the invention will hereinafter appear.

In the accompanying drawing, Figure 1 illustrates diagrammatically and schematically one embodiment which the invention may assume in practice; whereas Figs. 2 to 5, inclusive, are across-the-line diagrams of circuit connections obtainable with the controller in different operative positions. Fig. 6 is a top view of the controller, with legends indicating the functional cooperation of the control drum in the various operative positions of the latter.

It is to be understood that the device illustrated is susceptible of various modifications without departing from the spirit and scope of my invention as defined in the appended claims.

Referring first to Fig. 1 of the drawing, the same illustrates a drum controller adapted to effect acceleration control including series parallel commutation of the circuits of a pair of motors $M^1$, $M^2$, when the latter are supplied with current from battery lines $B^1$, $B^2$, and also to effect acceleration control including series commutation only when the motors are supplied with current from trolley lines $L^1$, $L^2$. Means are also provided whereby the afore-described control may be effected under conditions of forward or reverse operation of the motors jointly.

More particularly, the controller comprises a set of eight stationary contacts designated as 10 to 17, and a cooperating rotatable drum Y carrying contact segments $12^a$ to $15^a$ and $10^b$ to $17^b$. The segments are divided into three electrically independent groups whereas the segments of each group are electrically connected. The controller is also provided with a plurality of stationary contacts 18 to 27 and 28 to 34 adapted to cooperate with segments $18^a$, $19^a$; $19^b$, $20^b$, $21^b$; $21^c$, $22^c$; $22^d$, $23^d$, $24^d$; $24^e$, $25^e$, $26^e$; and $26^f$, $27^f$, carried by an auxiliary drum Z.

The segments and contacts of auxiliary drum Z are so arranged that when said drum is moved to position A, contacts $18^a$, $19^a$, $20^b$, $21^b$, $22^d$, $24^e$, $25^e$ and $26^e$ will be in engagement with contacts 18 to 22 and 24 to 26, respectively, whereas segments $19^b$, $22^c$, $26^f$ and $27^f$ will be in engagement with contacts 29, 31, 33 and 34, respectively; thereby providing battery connections for effecting operation of the motors in the forward direction upon completion of the motor circuits by movement of the main drum Y to the right or in a counterclockwise direction. Thus, upon movement of drum Y to position 1 under the aforementioned conditions the motors are connected in series with each other and in series with resistances $r^1$ to $r^4$ across the battery lines $B^1$, $B^2$. Said circuit may be traced (Fig. 2) from line $B^1$ to contact 20 and segment $20^b$ to segment $19^b$, by contact 29 through the armature of motor $M^1$ from right to left, to contact 19 and segment $19^a$, to segment $18^a$ and contact 18, through the field $f^1$ to and through resistances $r^4$ and $r^2$, thence to contact 15 and segment $15^a$ to segment $12^a$, to contact 12 through resistances $r^1$ and $r^3$, thence through the field $f^2$ to contact 34, segments $27^f$ and $26^f$ to contact 33, thence through the armature of motor $M^2$ from right to left, to contact 26, segments $26^e$ and $25^e$ to contact 25 and line $B^2$.

Upon movement of drum Y to position 2 segment $13^a$ is brought into engagement with contact 13, thereby short-circuiting resistances $r^1$ and $r^3$; whereas upon movement of said drum to position 3 segment $14^a$ is brought into engagement with contact 14, thereby short-circuiting resistances $r^2$ and $r^4$, thus connecting motors $M^1$ and $M^2$ directly across battery lines $B^1$ and $B^2$ in series with each other.

Upon movement of drum Y to position $x$, the connections last described are maintained whereas engagement of the respective segments $11^b$, $12^b$, $15^b$ and $16^b$ with their cooperating fixed contacts 11, 12, 15 and 16 (segments $21^b$ and $24^c$ of drum Z being in engagement with contacts 21 and 24, respectively, as aforenoted) serves additionally to connect the motors across the lines $B^1$, $B^2$ in parallel with one another, resistances $r^1$ and $r^3$ being arranged to be included in the circuit of motor $M^2$ and resistances $r^2$ and $r^4$ being arranged to be included in the circuit of motor $M^1$; whereas movement of said drum to position 4 serves to interrupt the short-circuits around resistances $r^1$, $r^3$ and $r^2$, $r^4$, as well as the series connection between the motors, the parallel connections thereof being unaffected.

Movement of drum Y to position 5 serves to exclude resistance $r^1$ from the circuit of motor $M^2$ by engagement of segment $10^b$ with contact 10 and similarly to exclude resistance $r^2$ from the circuit of motor $M^1$ by engagement of segment $17^b$ with contact 17; whereas movement of said drum to position 6 serves through engagement of segments $13^b$ and $14^b$ with the respective contacts 13 and 14 to exclude resistance $r^3$ from the circuit of motor $M^2$ and similarly to exclude resistance $r^4$ from the circuit of motor $M^1$, thereby connecting said motors directly across lines $B^1$, $B^2$ in parallel relation. Drum Y is preferably provided with a suitable stop to prevent further movement thereof in a counter-clockwise direction.

Also any well known or suitable means may be provided to prevent movement of the auxiliary drum Z except when the main drum Y is in the off or neutral position, to prevent arcing on the former drum. Thus, assuming off positioning of drum Y, the drum Z may be moved (in a counterclockwise direction) to position B, in which position segments $19^b$, $20^b$, $21^b$, $22^d$, $24^c$, $25^e$, $26^f$ and $27^f$ are in engagement with the respective contacts 19 to 22 and 24 to 27; and segments $18^a$, $19^a$, $22^c$ and $26^e$ are in engagement with the respective contacts 28, 29, 31 and 33. Thereupon drum Y may be moved from off position to position 1 to connect the motors across lines $B^1$, $B^2$ in series with each other and in series with resistances $r^1$ to $r^4$, said connections providing for operation of the motors jointly in the reverse direction from that heretofore described. Said circuit may be traced (Fig. 3) from battery line $B^1$ to contact 20, segments $20^b$ and $19^b$ to contact 19, thence through the armature of motor $M^1$ from left to right, to contact 29, segments $19^a$ and $18^a$ to contact 28, thence through the field $f^1$, through resistances $r^4$ and $r^2$, to contact 15, segment $15^a$ to segment $12^a$ and contact 12, through resistances $r^1$ and $r^3$, through the field $f^2$, through contact 27 to segments $27^f$ and $26^f$, to contact 26, through the armature of motor $M^2$ from left to right, to contact 33, thence through segments $26^e$ and $25^e$ to contact 25 and battery line $B^2$. Drum Y may then be moved to positions 2, 3, $x$, 4, 5 and 6 to effect the series parallel commutations heretofore described.

With drum Y in the off position drum Z may be moved to position C, wherein segments $18^a$, $19^a$, $21^c$, $22^c$, $23^d$, $24^d$ and $26^e$ are in engagement with the respective contacts 18, 19, 21, 22, 23, 24 and 26, and segments $19^b$, $20^b$, $22^d$, $25^e$, $26^f$ and $27^f$ are in engagement with the respective contacts 29, 30, 31, 32, 33 and 34. The controller is thus preset for operation of the motors in a forward direction, with energy supplied from trolley lines $L^1$, $L^2$, upon completion of the proper circuit connections through operation of drum Y.

Due to the fact that the trolley line voltage is usually about 250 volts, or about twice that of the battery, it is desirable that the motors shall never be connected in parallel when the same are supplied from the trolley; whereas it is also desirable that an additional amount of resistance be included in series with the motors under the last-mentioned conditions. Accordingly, I have provided means whereby the drum Y is interlocked with auxiliary drum Z, so that when the latter is in the forward or reverse trolley position the former can only be rotated in the clockwise direction to effect series connection and commutation of the motors with an additional step of resistance initially in circuit therewith. Said means may comprise a cam secured to the operating shaft 35 of drum Z, said cam having a substantially semicircular high portion 36 and a substantially semicircular low portion 37 adapted to be connected by angular portions 38 and 39. Secured to the operating shaft 40 of drum Y is a disk 41 carrying radially and circumferentially spaced ridges or projections 42 and 43 of arc-shape. Pivoted intermediate the shafts 35 and 40, as indicated at 44, is a lever 45, said lever carrying pivoted rollers 46 and 47 at the respective ends thereof. Lever 45 is biased toward the shaft 35 by any suitable means such as the spring 48. As shown the roller 46 is in engagement with low cam surface 37 at a point in the latter corresponding with an off position of drum Z, whereas upon movement of said drum in a clockwise or counterclockwise direction to provide forward battery or reverse battery connections for the motors the roller 46 will remain in engagement with said portion 37. Under these conditions roller 47 will remain in the path of ridge 42 on drum 41, thereby preventing movement of drum Y to the left or in a clockwise direction; drum Y, however, being free to move in a counterclockwise direction to effect series parallel commutation of the motor circuits as heretofore described.

It is to be understood that ridge 42 may be omitted if desired, thereby permitting clockwise movement of drum Y under these conditions to effect parallel commutation of the motors directly. With such an arrangement, however, the segments $11^b$ and $12^b$ would preferably be shortened so that the same would not be operative in position $1^a$ of drum Y; whereas the controller would likewise not be operative to effect inclusion of the additional resistance $r^5$ under conditions of series communitation only, as hereinafter described. Thus, in position $2^a$ of drum Y the motors would be connected in parallel across battery lines $B^1$, $B^2$, with resistances $r^1$ and $r^3$ included in circuit with motor $M^2$ and resistances $r^2$ and $r^4$ included in circuit with motor $M^1$. Upon movement of drum Y to position $3^a$ segment $10^b$ would be brought into engagement with contact 10 thereby short-circuiting resistance $r^1$; whereas upon movement of drum Y to position $4^a$ segment $17^b$ would be brought into engagement with contact 17 thereby short-circuiting resistance $r^2$. Upon movement of drum Y to position $5^a$ segments $13^b$ and $14^b$ would be brought into engagement with contacts 13 and 14 thereby connecting the motors directly across battery lines $B^1$, $B^2$ in parallel relation. The aforementioned stop on drum Y would prevent further movement thereof in a clockwise direction.

Similarly if drum Z is moved into forward or reverse trolley position, wherein high portion 36 of the cam is in engagement with roller 46 the opposite roller 47 is forced inwardly into the path of ridge 43, whereby the drum Y is prevented from movement in a counterclockwise direction, but is free to move in a clockwise direction. Thus, with drum Z in the forward trolley position, C, drum Y may be moved in a clockwise direction to position $1^a$, which completes a circuit for motors $M^1$ and $M^2$ across trolley lines $L^1$, $L^2$ in series with each other and in series with resistance $r^1$ to $r^5$, inclusive. Said circuit may be traced (Fig. 4) from line $L^1$ to contact 22, segments $22^c$ and $21^c$, contact 21 to contact 11, segments $11^b$ and $12^b$ to contact 12, resistances $r^1$ and $r^3$, through the field $f^2$ to contact 34, segments $27^f$ and $26^f$ to contact 33 through the armature of motor $M^2$ from right to left, to contact 26, segment $26^e$ to segment $25^e$, contact 32 to contact 30, segments $20^b$ and $19^b$ to contact 29, thence through the armature of motor $M^1$ from right to left, to contact 19, segments $19^a$ and $18^a$ to contact 18, through the field $f^1$, and through resistances $r^4$, $r^2$ and $r^5$ to contact 31, segments $22^d$ and $23^d$, to contact 23 and line $L^2$. Upon movement of drum Y to position $2^a$ segments $15^b$ and $16^b$ are brought into engagement with contacts 15 and 16 (segment $24^d$ of drum Z being in engagement with contact 24, as aforenoted), thereby short-circuiting resistance $r^5$; whereas upon movement of said drum to position $3^a$ segment $10^b$ is brought into engagement with contact 10, thereby short-circuiting resistance $r^1$.

Upon movement of drum Y to position $4^a$ segment $17^b$ is brought into engagement with contact 17, thereby short-circuiting resistance $r^2$; whereas upon movement of said drum to position $5^a$ segments $13^b$ and $14^b$ are brought into engagement with contacts 13 and 14, thereby short-circuiting all of the resistances, whereby the motors are connected directly across lines $L^1$, $L^2$ in series relation to each other. As aforedescribed, a suitable stop is provided on drum Y to prevent further movement thereof in a clockwise direction.

With drum Y in the off position drum Z may be moved to the reverse trolley position, D, wherein segments $19^b$, $21^c$, $22^c$, $23^d$, $24^d$, $26^f$ and $27^f$ are in engagement with the respective contacts 19, 21, 22, 23, 24, 26 and 27, and segments $18^a$, $19^a$, $22^c$ and $26^e$ are in engagement with the respective contacts 28, 29, 31 and 33. The drum Y is then limited to movement in a clockwise direction, as aforedescribed, and upon movement thereof to position $1^a$ a circuit is completed for the motors across trolley lines $L^1$, $L^2$ in series with each other and in series with resistances $r^1$ to $r^5$, inclusive, to provide for operation of the motors jointly in a reverse direction from that aforedescribed. Said circuit may be traced (Fig. 5) from line $L^1$ to contact 22, segments $22^c$ and $21^c$ to contact 21, contact 11, to segments $11^b$ and $12^b$, to contact 12 through resistances $r^1$ and $r^3$, thence through the field $f^2$ to contact 27, segments $27^f$ and $26^f$ to contact 26, through the armature of motor $M^2$ from left to right, to contact 33, segments $26^e$ and $25^e$ to contact 32, to contact 30 and segments $20^b$ and $19^b$ to contact 19, thence through the armature of motor $M^1$ from left to right, to contact 29 and segments $19^a$ and $18^a$, to contact 28, thence through the field $f^1$, resistances $r^1$, $r^2$ and $r^3$, to contact 31, through segments $22^d$ and $23^d$ to contact 23 and line $L^2$. Thereafter the drum Y may be moved to positions $2^a$, $3^a$, $4^a$ and $5^a$ to effect the commutations heretofore described.

While I have shown one arrangement of segments on drum Y it will be apparent to those skilled in the art that the number of segments may be increased and the arrangement thereof varied to provide an increased number of steps of resistance gradation without increasing the number of cooperating fixed contacts or the number of resistances employed. Similarly other slight modifications of the device illustrated will readily suggest themselves to those skilled in the art.

What I claim and desire to secure by Letters Patent is:

1. The combination with a plurality of sources of electrical energy which differ from one another in electrical condition and a plurality of motors to be supplied from either of said sources, of control means for said motors providing for operation thereof jointly in a forward or reverse direction, said means also providing for acceleration control of said motors including series parallel commutation of the circuits thereof and also providing for selection between said sources and for limiting the circuit commutating power thereof to the commutation of series connections upon selection of certain of said sources.

2. The combination with a plurality of sources of electrical energy which differ from one another in electrical condition and a plurality of motors to be supplied from either of said sources, of control means for said motors providing for operation thereof jointly in a forward or reverse direction, said means also providing for acceleration control of said motors including series parallel commutation of the circuits thereof and also providing for selection between said sources, said control means having associated means rendering the same incapable of establishing parallel connection of the motors when supplied from one of said sources.

3. The combination with two sources of current which differ from one another in voltage and a plurality of motors to be supplied with energy from either of said sources, said motors being adapted for series parallel commutation of the circuits thereof and said circuits being provided with starting resistance to be progressively excluded for acceleration, of cooperating reversing and acceleration control means for said motors, said means being operable to simultaneously effect selection of the source of supply for said motors and the direction of operation of the latter, such selecting operation of said means serving also to effect selection of the value of such resistance to be included in circuit at starting, to thereby compensate for such difference in voltage of said sources.

4. The combination with two sources of electrical energy which differ from one another in voltage, of a plurality of motors to be energized from either of said sources, and control means for said motors comprising an acceleration control drum and an auxiliary control drum, said auxiliary drum being adapted in different operative positions thereof to simultaneously select the source of energy supply for said motors and the direction of operation of the latter, said accelerating drum being operable in one direction, in given positions of said auxiliary drum, to provide series parallel commutation of the circuits of said motors, and said accelerating drum being also operable in the reverse direction, in other positions of said auxiliary drum, to provide series commutation only of the circuits of said motors.

5. The combination with two sources of electrical energy which differ from one another in voltage, of a plurality of motors to be energized from either of said sources, and control means for said motors comprising an acceleration control drum and an auxiliary control drum, said auxiliary drum being adapted in different operative positions thereof to simultaneously select the source of energy supply for said motors and the direction of operation of the latter, said accelerating drum being operable in one direction, in given positions of said auxiliary drum, to provide series parallel commutation of the circuits of said motors, said accelerating drum being also operable in the reverse direction, in other positions of said auxiliary drum, to provide series commutation only of the circuits of said motors, and a mechanical interlock interposed between said control drums for insuring operation thereof in the manner aforedescribed.

6. The combination with two sources of electrical energy which differ from one another in voltage, of a plurality of motors to be energized from either of said sources, and control means for said motors comprising an acceleration control drum and an auxiliary control drum, said auxiliary drum being adapted in different operative positions thereof to simultaneously select the source of energy supply for said motors and the direction of operation of the latter, said accelerating drum being operable in one direction, in given positions of said auxiliary drum, to provide series parallel commutation of the circuits of said motors, said accelerating drum being also operable in the reverse direction, in other positions of said auxiliary drum, to provide series commutation only of the circuits of said motors, said accelerating drum having only three electrically independent groups of segments, and certain of said groups of segments being operable selectively to provide either parallel or series connections for said motors, depending upon the positioning of said auxiliary drum.

7. The combination with two sources of electrical energy which differ from one another in voltage, of a plurality of motors to be energized from either of said sources, and control means for said motors comprising an acceleration control drum and an auxiliary control drum, said auxiliary drum being adapted in different operative positions thereof to simultaneously select the source of energy supply for said motors and the direction of operation of the latter, said accelerating drum being operable in one direction, in given positions of said auxiliary drum, to provide series parallel commutation of the circuits of said motors, said accelerating drum being also operable in the reverse direction, in other positions of said auxiliary drum, to provide series commutation only of the circuits of said motors, said accelerating drum having only twelve segments arranged in three electrically independent groups of four segments each, and one of said groups of segments being operable selectively to provide either parallel or series connections for said motors, depending upon the positioning of said auxiliary drum.

8. The combination with alternative sources of power supply, of a plurality of electric motors to be supplied with power from either of said sources, said motors being adapted for series parallel commutation of the circuits thereof and said circuits being provided with starting resistances to be progressively excluded for acceleration, joint control means for said motors comprising an accelerating control drum and an auxiliary control drum, said auxiliary control drum being movable to certain positions thereof to preselect one of said sources of supply for said motors and the direction of operation of the latter, said main control drum being thereupon movable in one direction to effect series parallel commutation and resistance variation of the circuits of said motors, said auxiliary control drum being also movable to other positions thereof to preselect the other source of supply for said motors and the direction of operation of the latter, said main control drum being thereupon adapted when moved in a direction opposite to its first mentioned direction to effect resistance variation and series connection only of the circuits of said motors, and mechanical means for automatically locking said main control drum against movement in said first mentioned direction when said auxiliary control drum is in one of its last mentioned positions.

9. The combination with battery and trolley lines forming alternative sources of power supply, of a plurality of electric motors to be supplied with power from either of said sources, an auxiliary drum movable to given positions to preselect forward or reverse battery connections for the motors, said drum being also movable to other positions to preselect forward or reverse trolley connections for the motors, a plurality of resistances to be included in circuit with said motors, an accelerating drum adapted upon movement thereof in one direction, when said auxiliary drum is in one of its first mentioned positions, to effect series parallel commutation of the motor circuits including resistance variation, said accelerating drum being also adapted upon movement thereof in the opposite direction, when said auxiliary drum is in one of its second mentioned positions, to effect resistance variation and series connection only, and mechanical interlocking means adapted under said last mentioned conditions to restrict said accelerating drum to movement in said last mentioned direction.

In witness whereof, I have hereunto subscribed my name.

RICHARD B. HUNTER.